United States Patent
Ojiro (10) Patent No.: US 9,933,155 B2
(45) Date of Patent: Apr. 3, 2018

(54) RICH-LEAN BURNER

(71) Applicant: Rinnai Corporation, Nagoya-shi, Aichi (JP)

(72) Inventor: Takashi Ojiro, Nagoya (JP)

(73) Assignee: RINNAI CORPORATION, Nagoya-shi, Aichi (JP)

(*) Notice: Subject to any disclaimer, the term of this patent is extended or adjusted under 35 U.S.C. 154(b) by 327 days.

(21) Appl. No.: 14/693,164

(22) Filed: Apr. 22, 2015

(65) Prior Publication Data

US 2016/0312999 A1    Oct. 27, 2016

(51) Int. Cl.
| | |
|---|---|
| *F23Q 9/08* | (2006.01) |
| *F23C 6/04* | (2006.01) |
| *F23D 23/00* | (2006.01) |
| *F23D 99/00* | (2010.01) |
| *F23D 14/04* | (2006.01) |
| *F23D 14/10* | (2006.01) |

(52) U.S. Cl.
CPC ............ F23C 6/047 (2013.01); F23C 6/045 (2013.01); F23D 14/045 (2013.01); F23D 14/105 (2013.01); F23D 23/00 (2013.01); F23D 91/00 (2015.07); *F23C 2201/20* (2013.01); *Y02E 20/344* (2013.01)

(58) Field of Classification Search
CPC ........... F23C 6/045; F23C 6/047; F23D 91/00
See application file for complete search history.

(56) References Cited

FOREIGN PATENT DOCUMENTS

| | | | |
|---|---|---|---|
| JP | 07012312 A | * | 1/1995 |
| JP | H07-310906 A | | 11/1995 |
| JP | 08-303725 A | | 11/1996 |
| JP | H10-267230 A | | 10/1998 |
| JP | 2006-317070 A | | 11/2006 |
| JP | 2007-120805 A | | 5/2007 |
| JP | 3614745 B2 | | 11/2015 |

OTHER PUBLICATIONS

Takasu English translation.*
Aoki English translation.*
Office Action dated Apr. 25, 2017, issued in counterpart Japanese Patent Application No. 2014-010933, with machine translation. (8 pages).
Office Action dated Oct. 3, 2017, issued in counterpart Japanese application No. 2014-010933 w/English translation (6 pages).

* cited by examiner

*Primary Examiner* — Jason Lau
(74) *Attorney, Agent, or Firm* — Westerman, Hattori, Daniels & Adrian, LLP (57) ABSTRACT

A rich-lean burner has on an upper end portion thereof: a lean flame port longitudinally extended to eject a lean fuel-air mixture which is leaner in fuel concentration than a theoretical fuel-air ratio; a blind clearance located on each lateral side of the lean flame port, the blind clearance being free from ejection of a fuel-air mixture; and a rich flame port located on lateral outside of each of the blind clearances to eject a rich fuel-air mixture which is richer in fuel concentration than the theoretical fuel-air ratio. The rich-lean burner further has a lean-flame deforming device to deform a lean flame formed by combustion of the lean fuel-air mixture ejected from the lean flame port such that the shape of one lateral side of the lean flame becomes asymmetrical with the shape of laterally opposite side of the lean flame.

1 Claim, 10 Drawing Sheets

RICH-LEAN BURNER

BACKGROUND OF THE INVENTION

1. Technical Field

The present invention relates to a rich-lean burner having on an upper end portion thereof, a lean flame port extended in a back-and-forth direction (in a meaning of "longitudinal direction" or "longitudinally") to eject a lean fuel-air mixture which is leaner in fuel concentration than a theoretical fuel-air ratio; a blind clearance which is located on each side in the right-and-left direction (in a meaning of "lateral direction" or "laterally") of the lean flame port and which does not eject (or which is free from ejection of) a fuel-air mixture; and a rich flame port located on lateral outside of each of the blind clearances thereby ejecting a rich fuel-air mixture which is richer in fuel concentration than the theoretical fuel-air ratio.

2. Background Art

Although this kind of rich-lean burner is capable of reducing the $NO_x$ produced at the time of combustion, oscillated combustion is likely to occur at the time of high load combustion, thereby giving rise to the problem of combustion noises. As a solution, there is known a rich-lean burner in which the lean flame port is divided into a plurality of longitudinally disposed blocks so that the fuel concentrations of lean fuel-air mixture fluctuate within each of the blocks (see, e.g., Japan Patent No. 3614745). This prior art says that the frequency of combustion oscillation that occurs by the combustion of lean fuel-air mixture ejected from the lean flame port, is dispersed due to fluctuations in fuel concentrations, thereby suppressing the oscillatory combustion.

However, when the fuel concentrations in the lean fuel-air mixture get fluctuated as in the above-described prior art, there are disadvantages in: that the combustibility is likely to be deteriorated; that the region of good combustion (the range in which the combustion can take place well) becomes narrower; and that the margin becomes smaller for the change in volume of gas or for the change in volume of combustion air to be blown to the burner.

SUMMARY

Problems that the Invention is to Solve

The inventor of this invention has obtained the following finding as a result of strenuous efforts, namely, when the frequency of combustion oscillation of lean flame (flame that is formed by the combustion of lean fuel-air mixture ejected from the lean flame port) on one lateral side and the frequency of combustion oscillation on the laterally opposite side are equal to each other, and when these frequencies of combustion oscillation coincide with natural frequencies of the combustion box for housing therein the rich-lean burner and of exhaust pipes, etc., high-frequency resonances occur.

Based on the above finding, this invention has a problem of providing a rich-lean burner capable of suppressing the occurrence of high-frequency resonances at the time of combustion, without fluctuating the fuel concentrations of the lean fuel-air mixture.

Means for Solving the Problems

In order to solve the above problem, this invention is a rich-lean burner comprising on an upper end portion thereof: a lean flame port longitudinally extended to eject a lean fuel-air mixture which is leaner in fuel concentration than a theoretical fuel-air ratio; a blind clearance located on each lateral side of the lean flame port, the blind clearance being free from ejection of a fuel-air mixture; and a rich flame port located on lateral outside of each of the blind clearances to eject a rich fuel-air mixture which is richer in fuel concentration than the theoretical fuel-air ratio. The rich-lean burner further comprises a lean-flame deforming means to deform the lean flame formed by combustion of the lean fuel-air mixture ejected from the lean flame port such that the shape of one lateral side of the lean flame becomes asymmetrical with the shape of laterally opposite side of the lean flame.

According to this invention, the frequency of combustion oscillation on one lateral side of the lean flame will be different from the frequency of combustion oscillation on the laterally opposite side of the lean flame due to the difference in shape, whereby the occurrence of high-frequency resonances at the time of combustion can be suppressed. In addition, according to this invention, it is not necessary to fluctuate the fuel concentration of the lean fuel-air mixture. As a result, there can be resolved the disadvantages in connection with the fluctuations of the fuel concentration, the disadvantages being in: that the combustibility is likely to be deteriorated; that the region of good combustion (the range in which the combustion can take place well) becomes narrower; and that the margin becomes smaller for the change in volume of gas or for the change in volume of combustion air to be blown to the burner.

Preferably, the lean-flame deforming means is arranged: such that a breadth of blind clearance on one lateral side of the lean flame port is different from a breadth of blind clearance on the laterally opposite side of the lean flame port; or such that an upper end of a plate to partition the lean flame port and the blind clearance on one lateral side of the lean flame port is different in height from an upper end of a plate to partition the lean flame port and the blind clearance on the laterally opposite side of the lean flame port; or such that an upper end of a plate to partition the blind clearance on one lateral side of the lean flame port and the rich flame port on lateral outside of the blind clearance is different in height from an upper end of a plate to partition the blind clearance on the laterally opposite side of the lean flame port and the rich flame port on the lateral outside of the blind clearance.

Furthermore, according to this invention, preferably, the lean-flame deforming means is arranged such: that the lean flame port is divided into a plurality of longitudinally disposed blocks; and that the shape of one lateral side of the lean flame formed by the combustion of lean fuel-air mixture ejected from the block of even-numbered lean flame ports as counted from a front end is symmetrical with the shape of laterally opposite side of the lean flame formed by the combustion of lean fuel-air mixture ejected from the block of odd-numbered lean flame ports as counted from the front end. According to this arrangement, the shape of the lean flames formed on the laterally same side of the longitudinally adjoining lean flame blocks can be made different from each other. As a result, the frequencies of combustion oscillation of the lean flames, on the laterally same side, to be formed in the adjoining lean flame blocks can be made different from each other, whereby the occurrence of high-frequency resonancies at the time of combustion can be further suppressed.

DESCRIPTION OF PREFERRED EMBODIMENTS

With reference to FIGS. 1 through 4, reference numeral 1 denotes a rich-lean burner according to an embodiment of this invention. The rich-lean burner 1 has on an upper end portion thereof, a lean flame port 2 extended in a longitudinal (i.e., front-and-rear) direction and ejecting a lean fuel-air mixture which is leaner in fuel concentration than a theoretical fuel-air ratio; a pair of blind clearances 4, 4 (i.e., each clearance with a lower end thereof being closed to passage) which are located on each lateral (i.e., right-and-left) side of the lean flame port 2 and which do not eject (i.e., which are free from ejection of) a fuel-air mixture; and a pair of rich flame ports 3, 3 one of which is located on lateral outside of the blind clearance 4 on one lateral side of the lean flame port 2 and the other of which is located on lateral outside of the blind clearance 4 on the laterally opposite side of the lean flame port 2, the pair of rich flame ports ejecting a rich fuel-air mixture that is richer in fuel concentration than the theoretical fuel-air ratio.

The rich-lean burner 1 is made up of the following constituent members, i.e., a burner main body 5 having a pair of side plates 51, 51 which lie laterally opposite to each other; a pair of side plates 61, 61 to cover the burner main body 5 from an outside on one lateral side and from an outside on the laterally opposite side; a burner cap 6 having bridge portions 62 at a plurality of longitudinal locations to connect the both side plates 61, 61 together at upper ends thereof, and a straightening member 7 which is mounted between both the side plates 51, 51 of the burner main body 5 and which has a plurality of straightening plates for dividing the lean flame port 2 into a plurality of laterally disposed zones.

Both the side plates 51, 51 of the burner main body 5 are formed by bending a single piece of metallic plate into the shape of a principal rafter along a bending line which is the bottom edge of the burner main body 5. The burner main body 5 is provided, by press-forming both the side plates 51, 51: with a lean fuel-air mixing tube portion 52 which extends backward from an inlet port 52a opening in a lower front end of the burner main body 5; and with a lean fuel-air mixture passage portion 53 which introduces the lean fuel-air mixture from the lean fuel-air mixing tube portion 52 into the lean flame port 2. The inlet port 52a of the lean fuel-air mixing tube portion 52 is relatively large in area of opening. A relatively large volume of primary air flows into the lean fuel-air mixing tube portion 52 together with the fuel gas from a lean gas nozzle (not illustrated) that lies to face the inlet port 52a, whereby a lean fuel-air mixture is generated. The lean fuel-air mixture passage portion 53 is extended from the rear end of the lean fuel-air mixing tube portion 52 upward so as to expand in the longitudinal direction.

In a portion between the lean fuel-air mixing tube portion 52 and the lean fuel-air mixture passage portion 53 of the burner main body 5, there is provided a rich fuel-air mixture passage portion 54 which is formed by press-forming both the side plates 51, 51. The rich fuel-air mixture passage portion 54 extends slightly backward from an inlet port 54a which opens into a front end of the burner main body 5, and is terminated. At a rear side surface of the rich fuel-air mixture passage portion 54, there are provided outlet openings 54b. The inlet port 54a of the rich fuel-air mixing tube portion 54 is relatively small in area of opening. A relatively small volume of primary air flows into the rich fuel-air mixing tube portion 54 together with the fuel gas from a rich gas nozzle (not illustrated) that faces opposite to the inlet port 54a, whereby a rich fuel-air mixture is generated.

The rich fuel-air mixture ejected from the outlet openings 54b of the rich fuel-air mixture tube portion 54 is introduced into each of the rich flame ports 3 through a rich fuel-air mixture passage portion 63 defined between each of the side plates 51 of the burner main body 5 and each of the side plates 61 of the burner cap 6. Further, at a plurality of positions distributed in the longitudinal direction of an upper portion of each of the side plates 61 of the burner cap 6, there are formed recessed portions 64 which partition the rich flame ports 3 in a longitudinal direction.

Figure 1:
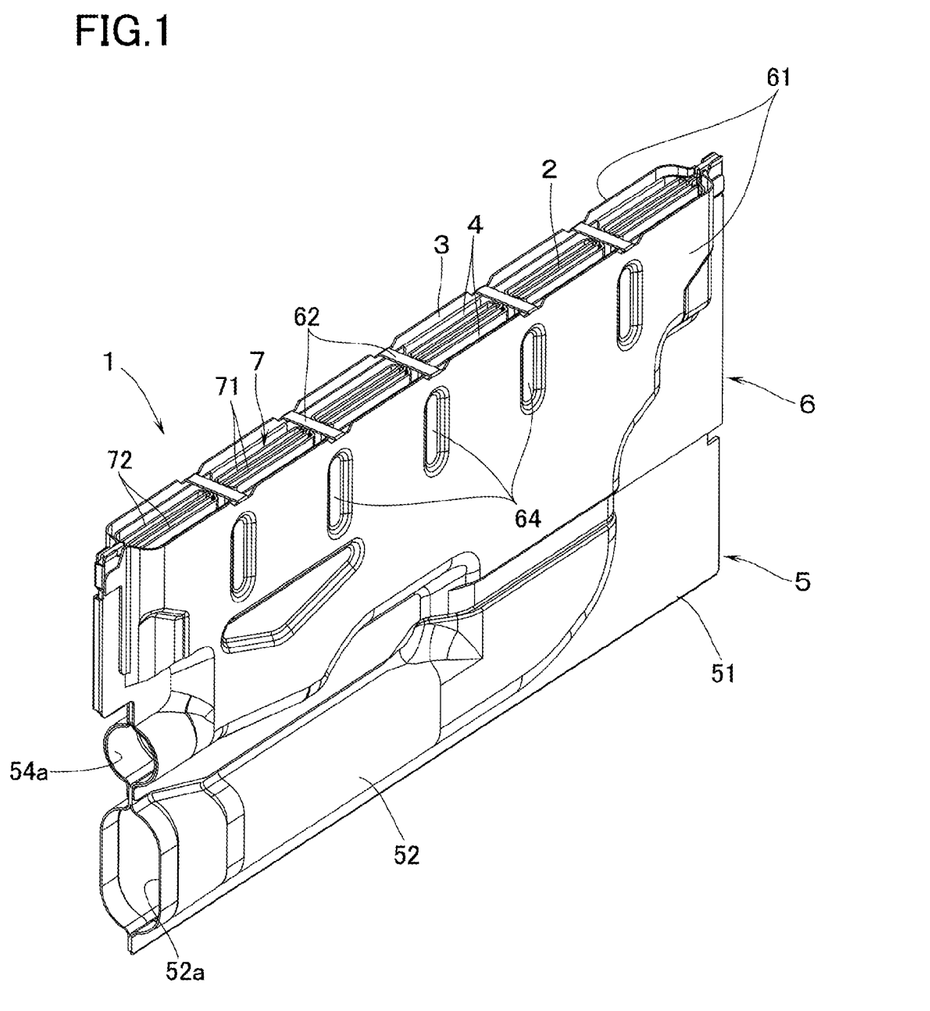
FIG. 1 is a perspective view of a rich-lean burner according to a first embodiment of this invention.
Figure 2:
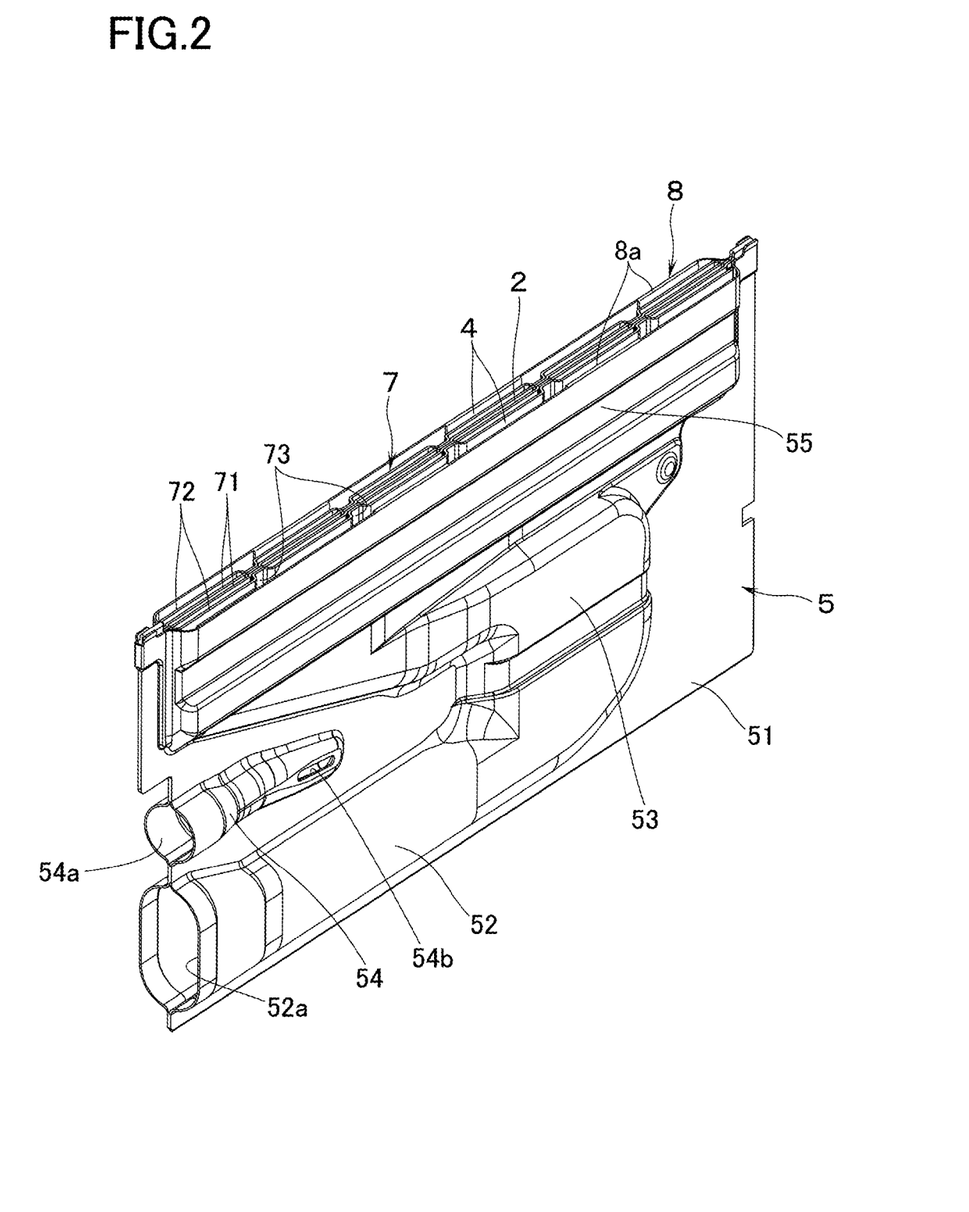
FIG. 2 is a perspective view of the rich-lean burner, with the caps removed, according to the first embodiment.
Figure 3:
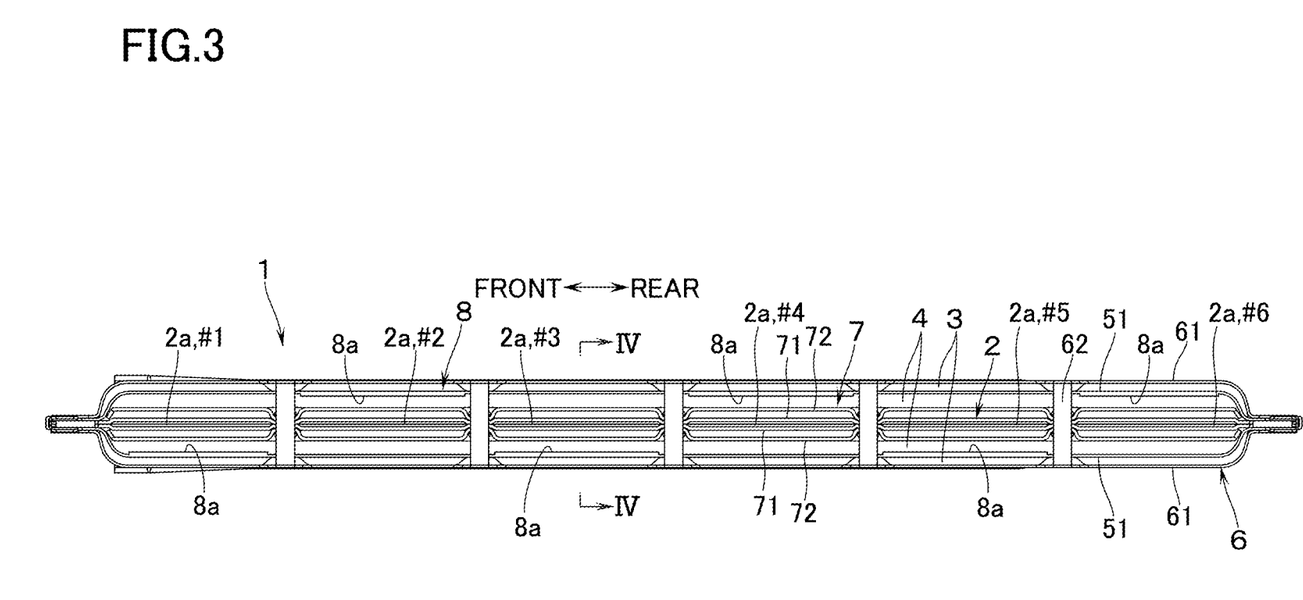
FIG. 3 is a plan view of the rich-lean burner according to the first embodiment.

The straightening member 7 has a pair of inner straightening plates 71 located on lateral inside, and a pair of outer straightening plates 72 located on both lateral outsides. The straightening member 7 further has longitudinally positioned five constricted (or gathered) portions 73 at which the inner straightening plates 71 and the outer straightening plates 72 are laterally brought into close contact with each other, thereby dividing the lean flame port 2 into a plurality of longitudinally divided blocks. In concrete, five constricted portions 73 are present to divide the lean flame port 2 into six blocks 2a from #1 through #6 blocks.

Figure 4:
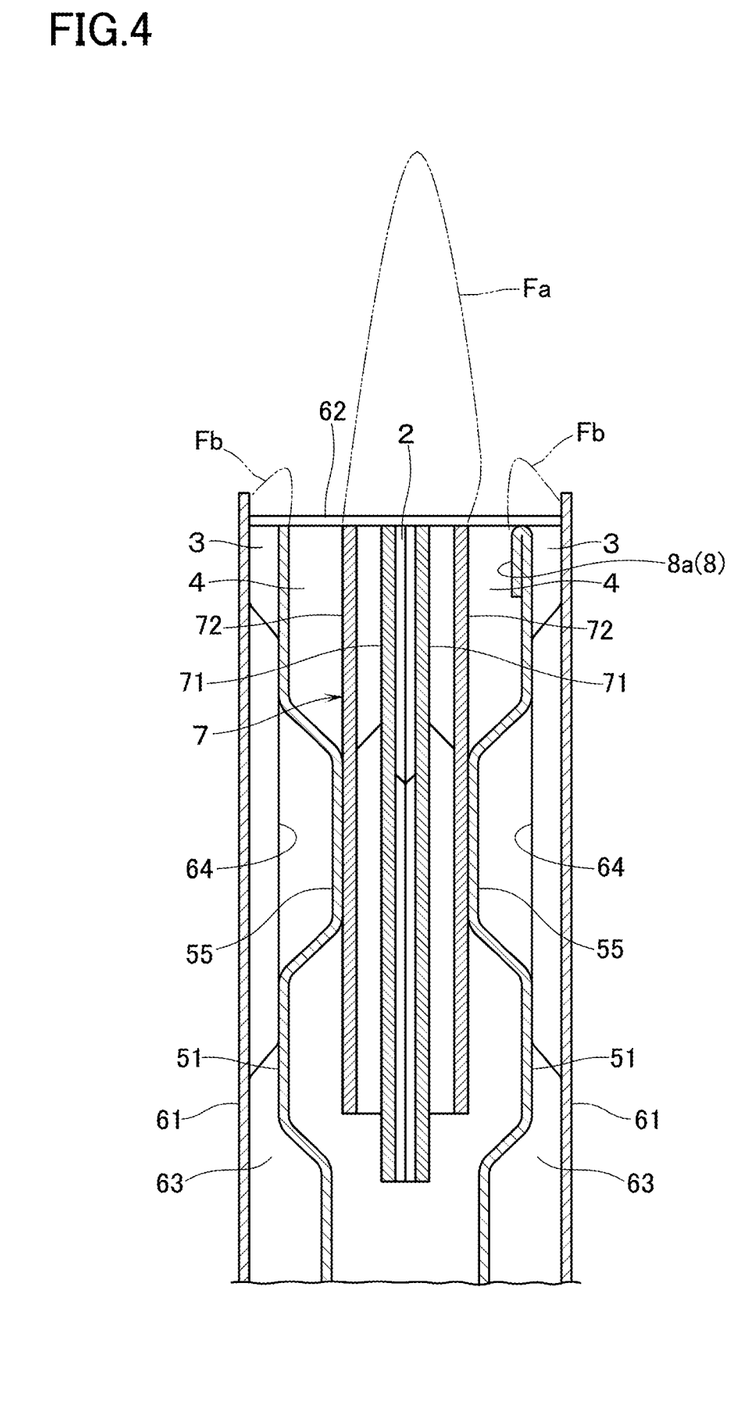
FIG. 4 is a sectional view taken along the line IV-IV in FIG. 3.

On the upper portion of each of the side plates 51 of the burner main body 5, there are formed dented portions 55 which are elongated in the longitudinal direction so as to contact the outer straightening plates 72. As a result, blind clearances 4 are defined between a portion of each side plate 51 above the dented portions 55 and the outer straightening plates 72, and the rich flame port 3 is defined between each side plate 51 of the burner main body 5 and each side plate 61 of the burner cap 6.

Further, the rich-lean burner 1 has a lean-flame deforming means 8 which deforms a lean flame Fa formed by the combustion of the lean air-fuel mixture ejected from the lean flame port 2 such that the shape of one lateral side of the lean flame Fa becomes asymmetrical with the shape of the laterally opposite side of the lean flame Fa. In addition, the lean-flame deforming means 8 is disposed such that the shape of one lateral side of the lean flames Fa and the shape of the laterally opposite side of the lean flames Fa become symmetrical with each other, where the one lateral side of the lean flames Fa are those formed by the combustion of the lean fuel-air mixture ejected from the blocks 2a of even-numbered lean flame ports 2 as counted from the front, i.e., #2, #4, and #6 blocks 2a, and where the laterally opposite side of the lean flames Fa are those formed by the combustion of the lean fuel-air mixture ejected from the blocks 2a of odd-numbered lean flame ports 2 as counted from the front, i.e., #1, #3, and #5 blocks 2a.

More detailed explanation will be made thereabout. On an upper end of the side plate 51 which is present in one lateral side of the burner main body 5, there is formed a folded (or bent) portion 8a in which the side plate 51 is folded laterally inside. In this manner, the breadth of the blind clearance 4 on one lateral side of the lean flame port 2 is made narrower by the thickness of the folded portion 8a than the breadth of the blind clearance 4 on the laterally opposite side of the lean flame port 2. In addition, at the longitudinal portions that coincide with the #2, #4, and #6 blocks 2a, there are formed folded portions 8a at upper ends of the side plates 51 of the one lateral side (upper side as seen in FIG. 3) of the burner main body 5. At the longitudinal portions that coincide with the #1, #3, and #5 blocks 2a, there are formed folded portions 8a at upper ends of the side plates 51 on the laterally opposite side (lower side as seen in FIG. 3) of the burner main body 5.

As described above, by narrowing the breadth of the blind clearance 4 on one lateral side of the lean flame port 2, the rich flame Fb that is formed by the combustion of the rich fuel-air mixture ejected from the rich flame port 3 on the outside of the said blind clearance 4 comes closer to the lean flame Fa. As a result, as shown in FIG. 4, the bottom portion of one lateral side of the lean flame Fa is pulled by the rich flame Fb so that the bottom portion on one lateral side of the lean flame Fa expands (or swells) outward. Therefore, the shape of one lateral side of the lean flame Fa becomes asymmetrical with the shape of the laterally opposite side of the lean flame Fa. According to this arrangement, the frequency of combustion oscillation on one lateral side of the lean flame Fa becomes different from the frequency of combustion oscillation on the laterally opposite side of the lean flame Fa due to the difference in shape of the lean flame Fa, whereby the occurrence of high-frequency resonances at the time of combustion can be suppressed.

The lean flames Fa formed in the #2, #4, and #6 blocks 2a expand outward at the bottom portions of one lateral side. The lean flames Fa formed in the #1, #3, and #5 blocks 2a expand outward at the bottom portions of the laterally opposite side. In other words, the shape of one lateral side of the lean flame Fa formed in the #2, #4, and #6 blocks 2a becomes symmetrical with the shape of the laterally opposite side of the lean flame Fa formed in the #1, #3, and #5 blocks 2a. According to this arrangement, the shapes of the lean flames Fa, on the same lateral side, formed in block 2a of the longitudinally adjoining lean flame ports 2 will be different from each other. The frequencies of combustion oscillation on the same lateral side of the lean flames Fa also become different, whereby the occurrence of the high-frequency resonances can further be suppressed.

Figure 5:
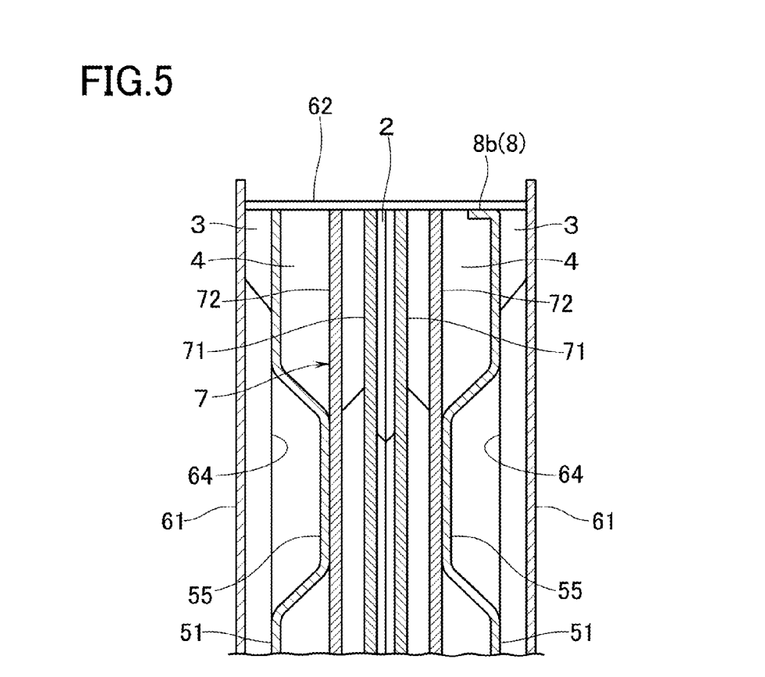
FIG. 5 is a sectional view of an essential portion of the rich-lean burner according to a second embodiment.
Figure 6:
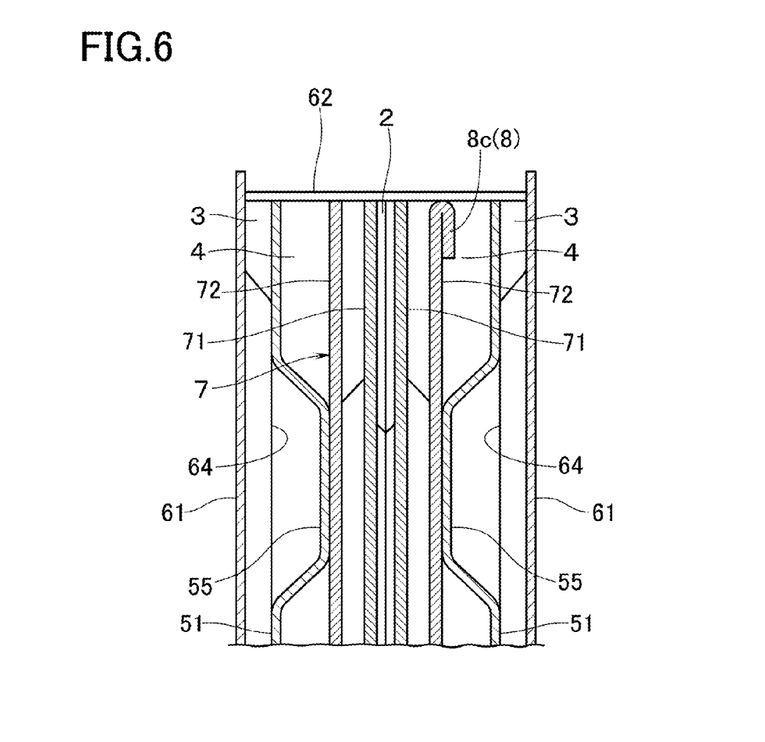
FIG. 6 is a sectional view of an essential portion of the rich-lean burner according to a third embodiment.
Figure 7:
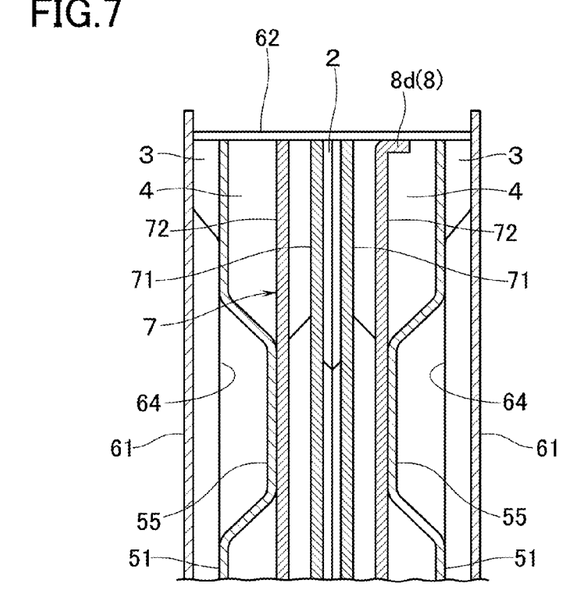
FIG. 7 is a sectional view of an essential portion of the rich-lean burner according to a fourth embodiment.
Figure 8:
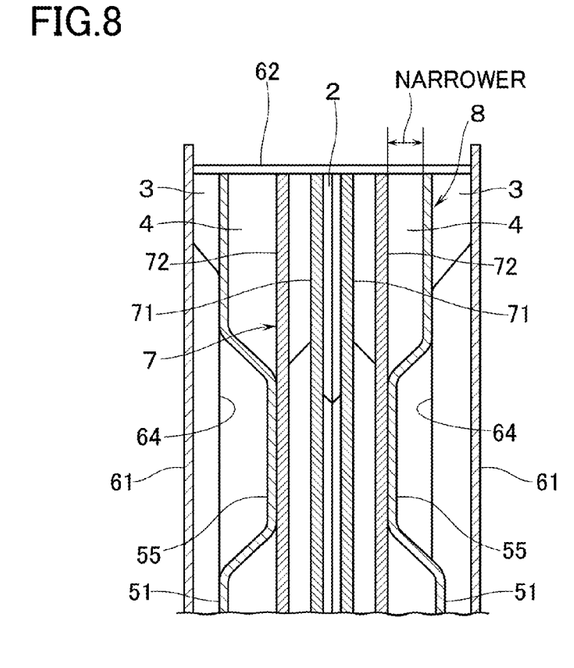
FIG. 8 is a sectional view of an essential portion of the rich-lean burner according to a fifth embodiment.

As a method of arranging the lean-flame deforming means 8 to deform the lean flame such that the breadth of the blind clearance 4 of one lateral side of the lean flame port 2 is different from the breadth of the laterally opposite side of the lean flame port 2, the following methods are considered. In other words, aside from the method of forming a folded portion 8a on an upper end of the side plate 51 on one lateral side of the burner main body 5 according to the first embodiment, the method of the second embodiment is as shown in FIG. 5. In other words, there is formed a folded portion 8b which is folded laterally inward on an upper end of the side plate 51 on one lateral side of the burner main body 5. In the third embodiment, as shown in FIG. 6, there is formed a folded portion 8c on an upper end of the outer straightening plate 72 on one lateral side. In the fourth embodiment, as shown in FIG. 7, there is formed a folded portion 8d which is folded laterally outward on an upper end of the outer straightening plate 72 on one lateral side. In the fifth embodiment, as shown in FIG. 8, such a part of the side plate 51, on one lateral side (right side as seen in FIG. 8) of the burner main body 5, as is above the dented portion 55 is made closer to the outer straightening plate 72 (i.e., breadth of the blind clearance 4 is made narrower).

Figure 9:
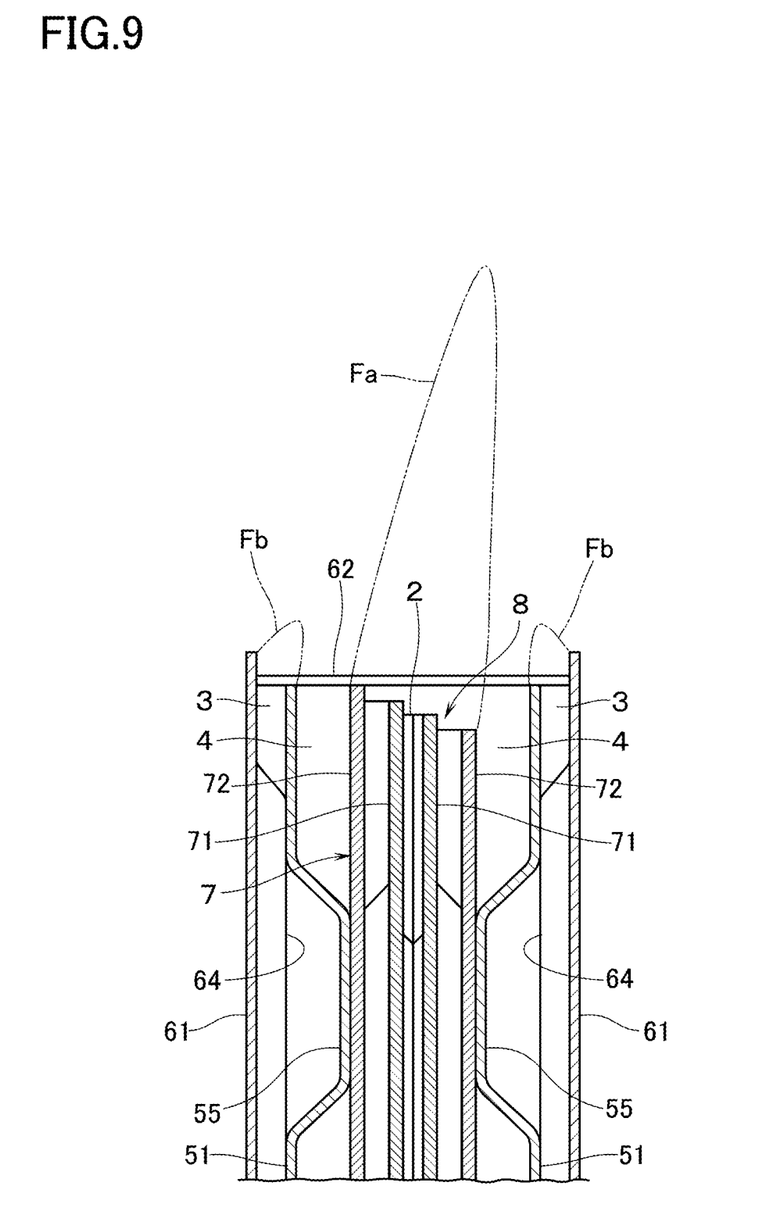
FIG. 9 is a sectional view of an essential portion of the rich-lean burner according to a sixth embodiment.

The lean-flame deforming means 8 may alternatively be arranged such that the height of an upper end of the outer straightening plate 72 on one lateral side, which plate 72 being to partition the lean flame port 2 and the blind clearance 4 on one lateral side thereof, is different from the height of an upper end of the outer straightening plate 72 on the opposite side, which plate being to partition the lean flame port 2 and the blind clearance 4 on the laterally opposite side thereof. For example, the sixth embodiment as shown in FIG. 9 has an arrangement in which the heights of the upper ends of the straightening plates 71, 72 on the inner side and on the outer side, respectively, are made gradually lower toward one lateral side so that the upper end of the straightening plate 72 on one lateral side is the lowest. According to this arrangement, the lean flame inclines toward one lateral side where the outer straightening plate 72 having lower upper end is positioned. As a result, the shape on one lateral side and on the laterally opposite side of the lean flame Fa become asymmetrical with each other.

Figure 10:
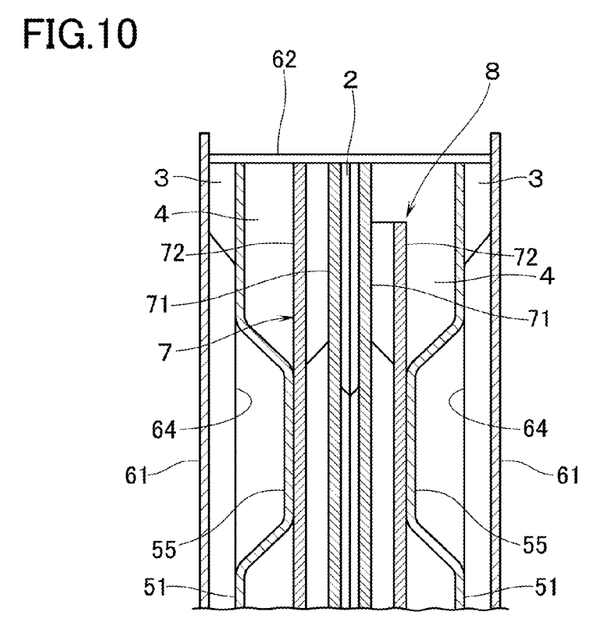
FIG. 10 is a sectional view of an essential portion of the rich-lean burner according to a seventh embodiment.
Figure 11:
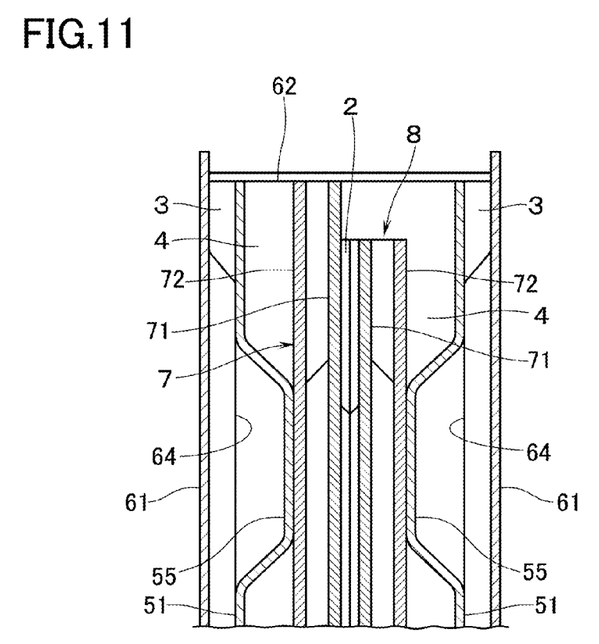
FIG. 11 is a sectional view of an essential portion of the rich-lean burner according to an eighth embodiment.

In the seventh embodiment as shown in FIG. 10, only the height of the upper end of the outer straightening plate 72 on one lateral side may be arranged to be lower. Further, in the eighth embodiment as shown in FIG. 11, in addition to the outer straightening plate 72 on one lateral side, the height of the upper end of the inner straightening plate 71 that is adjoining thereto may be lowered.

Figure 12:
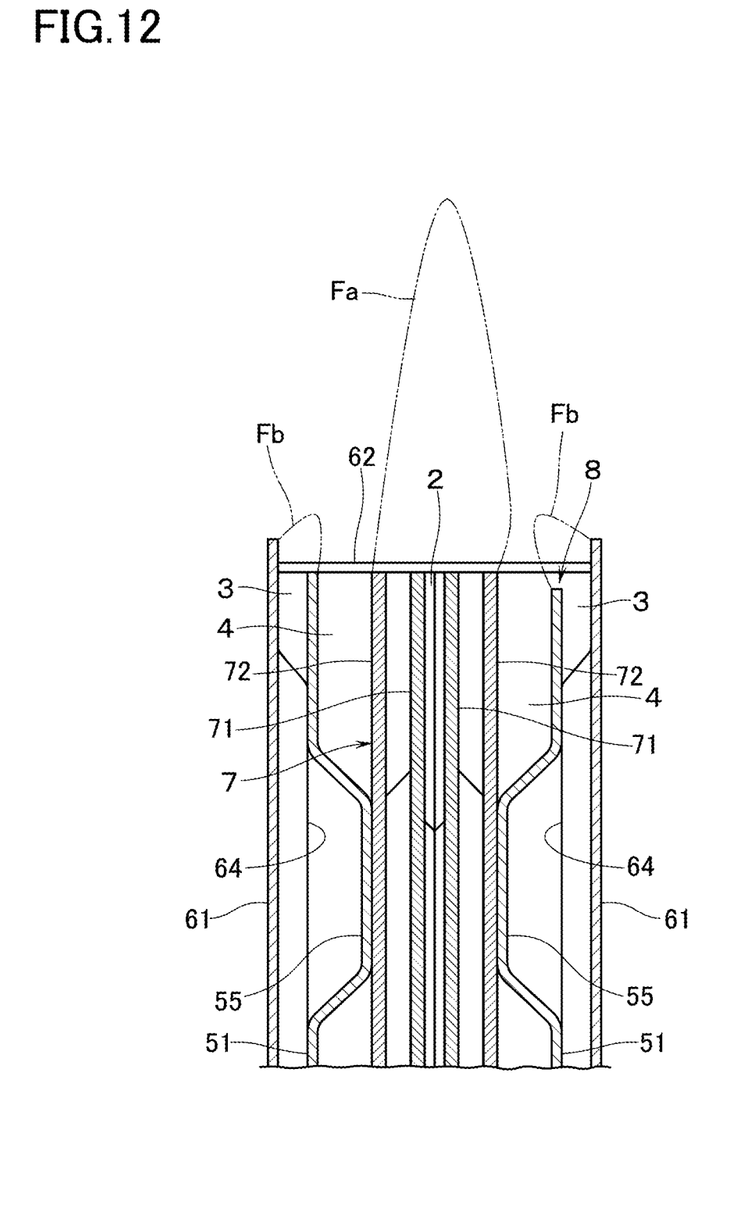
FIG. 12 is a sectional view of an essential portion containing a block of even-numbered lean flame ports as counted from a front end of the rich-lean burner according to a ninth embodiment.

According to the ninth embodiment as shown in FIG. 12, the lean-flame deforming means 8 may be arranged such that the height of the upper end of a side plate 51 on one lateral side of the burner main body 5, the side plate 51 being to partition the blind clearance 4 on one lateral side of the lean flame port 2 and the rich flame port 3 on lateral outside, is different from the height of the upper end of the side plate 51 on the laterally opposite side of the burner main body 5, the side plate 51 being to partition the blind clearance 4 on the laterally opposite side of the lean flame port 2 and the rich flame port 3 on lateral outside thereof. As shown in FIG. 12, when the upper end of the side plate 51 on one lateral side of the burner main body 5 is arranged to be lower, the angle of inclination, toward one lateral side, of the rich flame Fb formed in the rich flame port 3 on the outside of the said side plate 51 will become larger, thereby coming closer to the lean flame. As a result, the bottom portion of one lateral side of the lean flame Fa will be pulled toward the rich flame Fb, thereby swelling toward the outside. As a result, the shape of one lateral side of the lean flame Fa becomes asymmetrical with the shape of the laterally opposite side.

Figure 13:
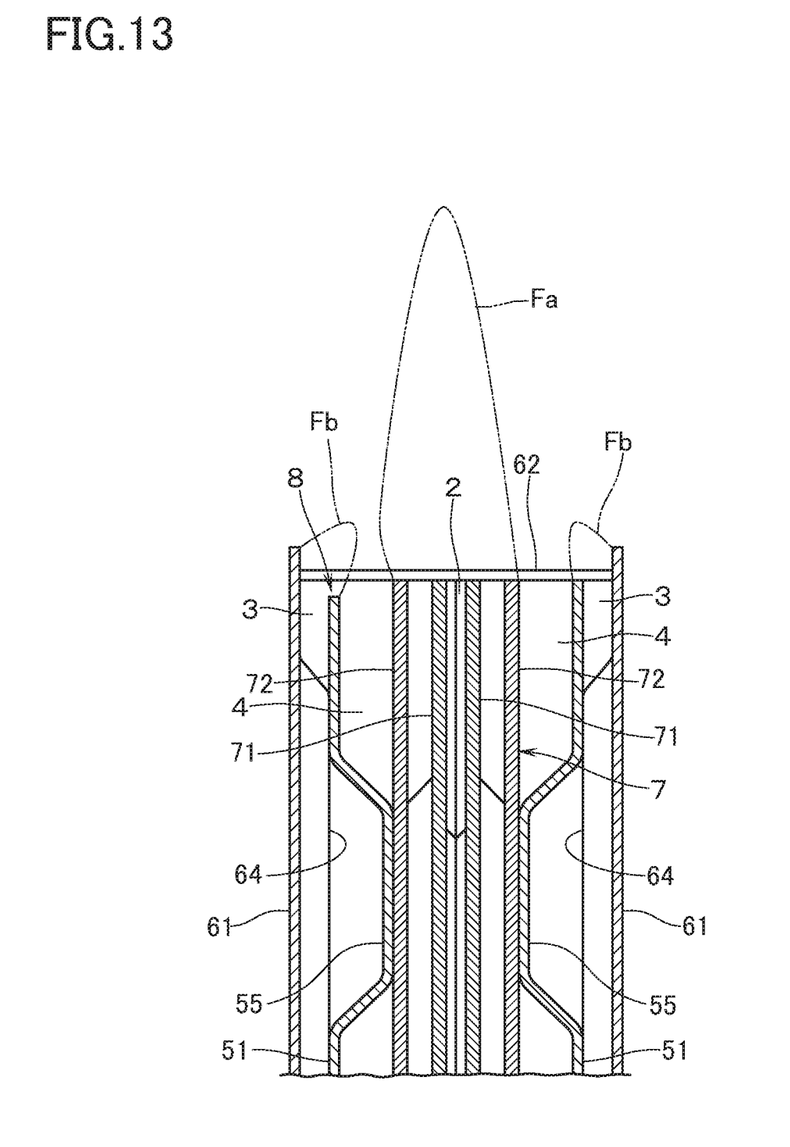
FIG. 13 is a sectional view of an essential portion containing a block of odd-numbered lean flame ports as counted from the front end of the rich-lean burner according to the ninth embodiment.

In any of the second through ninth embodiments, in the same manner as in the first embodiment, the lean-flame deforming means 8 shall preferably be disposed so that the shape of one lateral side of the lean flame formed in even-numbered blocks of lean flame ports 2 as counted from the front becomes symmetrical with the shape of the laterally opposite side of the lean flame formed in odd-numbered blocks of lean flame ports 2 as counted from the front. Specifically, in the even-numbered blocks as counted from the front, as shown in FIG. 12, the height of the upper end of the side plate 51 on one lateral side of the burner main body 5 is arranged to be lower than the height of the upper end of the laterally opposite side of the side plate 51. In the odd-numbered blocks as counted from the front, as shown in FIG. 13, the height of the upper end of the side plate 51 on the laterally opposite side of the burner main body 5 is arranged to be lower than the height of the upper end of the laterally one side of the side plate 51.

What is claimed is:

1. A rich-lean burner comprising on an upper end portion thereof: a lean flame port longitudinally extended to eject a lean fuel-air mixture which is leaner in fuel concentration than a theoretical fuel-air ratio; a blind clearance located on each lateral side of the lean flame port, the blind clearance being free from ejection of a fuel-air mixture; and a rich flame port located on lateral outside of each of the blind clearances to eject a rich fuel-air mixture which is richer in fuel concentration than the theoretical fuel-air ratio, wherein the rich-lean burner further comprises a lean-flame deforming means to deform a lean flame formed by combustion of the lean fuel-air mixture ejected from the lean flame port such that the shape of one lateral side of the lean flame becomes asymmetrical with the shape of laterally opposite side of the lean flame;

wherein the lean-flame deforming means is arranged such that an upper end of a plate to partition the blind clearance on one lateral side of the lean flame port and the rich flame port on lateral outside of blind clearance is different in height from an upper end of a plate to partition the blind clearance on the laterally opposite side of the lean flame port and the rich flame port on the lateral outside of the blind clearance; and wherein the lean-flame deforming means is arranged such: that the lean flame port is divided into a plurality of longitudinally disposed blocks; and that the shape of one lateral side of the lean flame formed by the combustion of lean fuel-air mixture ejected from the block of even-numbered lean flame ports as counted from a front end is symmetrical with the shape of the laterally opposite side of the lean flame formed by the combustion of lean fuel-air mixture ejected from the block of odd-numbered lean flame ports as counted from the front end.

\* \* \* \* \*